US012316201B2

(12) United States Patent
Roll et al.

(10) Patent No.: US 12,316,201 B2
(45) Date of Patent: May 27, 2025

(54) VENTILATION FOR ELECTRIC GENERATOR SYSTEM

(71) Applicant: RV Mobile Power, LLC, Columbus, OH (US)

(72) Inventors: Michael Roll, West Bend, WI (US); Barry Ousley, Syracuse, IN (US); Evan Whitney, Edwardsburg, MI (US)

(73) Assignee: RV Mobile Power, LLC, Columbus, OH (US)

( * ) Notice: Subject to any disclaimer, the term of this patent is extended or adjusted under 35 U.S.C. 154(b) by 0 days.

(21) Appl. No.: 17/929,726

(22) Filed: Sep. 5, 2022

(65) Prior Publication Data
US 2022/0416623 A1 Dec. 29, 2022

Related U.S. Application Data

(63) Continuation of application No. 17/017,051, filed on Sep. 10, 2020, now Pat. No. 11,437,887.

(60) Provisional application No. 62/899,191, filed on Sep. 12, 2019.

(51) Int. Cl.
*H02K 9/06* (2006.01)
*B60P 3/32* (2006.01)

(52) U.S. Cl.
CPC . *H02K 9/06* (2013.01); *B60P 3/32* (2013.01)

(58) Field of Classification Search
CPC .......... H02K 9/04; H02K 9/06; H02K 7/1815; H02K 11/33; H02K 5/20; B60P 3/32; F02B 63/044
See application file for complete search history.

(56) References Cited

U.S. PATENT DOCUMENTS

| | | | |
|---|---|---|---|
| 4,835,405 A | 5/1989 | Clancey et al. | |
| 4,862,009 A | 8/1989 | King | |
| 4,871,922 A | 10/1989 | Heinrich | |
| 5,914,551 A | 6/1999 | Kern et al. | |
| 7,064,454 B2 | 6/2006 | Fukaya et al. | |
| 8,381,865 B2 * | 2/2013 | Okada | E02F 9/00 60/272 |
| 10,221,780 B2 | 3/2019 | Sarder et al. | |
| 2007/0227470 A1 | 8/2007 | Cole | |
| 2010/0152958 A1 | 6/2010 | McAndrew, III | |
| 2015/0352961 A1 | 12/2015 | Kim | |
| 2016/0230654 A1 * | 8/2016 | Shatek | F01N 13/08 |
| 2016/0294255 A1 * | 10/2016 | Schmit | F02B 63/04 |
| 2016/0319728 A1 | 11/2016 | Jenison | |

(Continued)

FOREIGN PATENT DOCUMENTS

| | | |
|---|---|---|
| AU | 117 114 | 6/1943 |
| GB | 1 247 792 | 9/1971 |

*Primary Examiner* — Bryan R Perez
(74) *Attorney, Agent, or Firm* — C. Tumey Law Group PLLC

(57) ABSTRACT

In the disclosure herein, an electric generator system is shown and comprises a housing assembly, an electric generator positioned within the housing assembly, an engine positioned within the housing assembly and operatively coupled to the electric generator, a muffler assembly positioned within the housing assembly, and a dividing plate positioned between the engine and the muffler assembly. Exemplary embodiments include an engine fan positioned within the housing and driven by the engine with an engine fane inlet opening formed radially around the engine fan.

17 Claims, 16 Drawing Sheets

(56) References Cited

U.S. PATENT DOCUMENTS

| | | |
|---|---|---|
| 2016/0363099 A1 | 12/2016 | Collie et al. |
| 2017/0271942 A1 | 9/2017 | Koyama |
| 2018/0080392 A1 | 3/2018 | Janscha |
| 2018/0195814 A1* | 7/2018 | Clouse .................... F28F 9/007 |
| 2019/0353081 A1* | 11/2019 | Sarder ....................... F01P 5/04 |

\* cited by examiner

VENTILATION FOR ELECTRIC GENERATOR SYSTEM

CROSS-REFERENCE TO RELATED APPLICATIONS

This application claims priority to U.S. application Ser. No. 17/017,051, filed on Sep. 10, 2020 now issued U.S. Pat. No. 11,437,887, which claims priority to U.S. Provisional Application No. 62/899,191, filed Sep. 12, 2019, the entire contents of all of these filings are herein incorporated by reference.

BACKGROUND OF THE TECHNOLOGY

The present technology relates to ventilation for an electric generator system, for example, an electric generator system that may be used in a recreational vehicle (RV).

RVs typically are self-propelled, e.g., built on a chassis with an engine, steering controls, etc., or may be transported by another vehicle, e.g., by being towed. In the former arrangement, the engine propelling the RV may drive an alternator to generate sufficient electrical power for the RV's electronics and, in the latter arrangement, the towing vehicle's engine may drive an alternator to generate sufficient electrical power for the RV's electronics. Additionally, when an RV of either of these arrangements is parked, e.g., at a campsite, the RV may be connected to an external power source to supply electrical power for the electronics. However, under certain circumstances, these power sources may be unavailable or inadequate for the electrical power demand of the electronics. For example, the RV's engine or the towing vehicle's engine may not be capable of generating sufficient electrical power while underway, or the RV may be parked at a location where another external source of electrical power is not available and it may be inefficient to operate the RV's engine or the towing vehicle's engine to generate the needed electrical power.

Thus, it may be desirable to use a separate electrical generator system to generate the needed electrical power. This may be preferable because a separate electrical generator can be optimally designed for the purpose of generating electrical power, while design constraints applicable to such an electrical generator may not be optimal for the engine that propels the RV.

Additionally, the user may find it preferable to have the electrical generator system incorporated within the RV itself, rather than purchasing an off-the-shelf electrical generator system that is essentially additional cargo and must be stowed and transported with the RV. RVs typically are built with storage areas, but an off-the-shelf electrical generator system is unlikely to be capable of operating within such a storage area, e.g., due to exhaust fumes and heat generated by the electrical generator system. Thus, every time the user would want to operate an off-the-shelf generator system it would be necessary to remove the electrical generator system from the storage area and then connect it to the RV's electrical system for operation.

To address the inconvenience of having to remove the electrical generator system, which may be heavy and cumbersome, from the RV's storage area and connect it to the RV's electrical system, an electrical generator system may be permanently integrated into a storage area of the RV and permanently connected to the RV's electrical system. While this arrangement may address the challenges discussed above, this arrangement may also present additional challenges. For example, the electrical generator still requires an engine to provide motive power to drive the electrical generator and produce electricity, and the engine will generate heat while driving the electrical generator. To protect the electrical generator system from the elements, it may be preferable to mount the electrical generator system in an internal storage area. Thus, the heat produced by the engine must be managed while enclosed in an internal storage area.

BRIEF SUMMARY OF THE TECHNOLOGY

An aspect of the present technology is directed to an electrical generator system that may include an electric generator driven by an engine.

In a further aspect of the present technology, the electric generator may provide electrical power to and/or receive electrical power from one or more other electrical components, such as an inverter.

A further aspect of the present technology is directed to an electric generator system. The electric generator includes: a housing assembly that forms at least one inlet vent opening and at least one outlet vent opening; an electric generator positioned within the housing assembly; at least one fan positioned within the housing assembly; an engine positioned within the housing assembly, the engine being operatively coupled to the electric generator and the at least one fan to drive the electric generator and the at least one fan during operation of the electric generator system; at least one electrical component electrically connected to the electric generator; and an electrical component fan that is positioned proximate to the at least one inlet vent opening and configured to draw air from externally of the housing assembly through the at least one inlet vent opening and direct air to the at least one electrical component during operation of the electric generator system, wherein the at least one fan is positioned generally opposite of the electrical component fan relative to the at least one electrical component to draw air across the at least one electrical component during operation of the electric generator system.

In examples of any of the aspects described in the preceding paragraphs: (a) a frame assembly may be connected to the housing assembly, (b) a muffler assembly may be positioned within the housing assembly and a dividing plate may be positioned between the engine and the muffler assembly, (c) the at least one fan may comprise an engine fan, (d) the at least one fan may comprise an electric generator fan, (e) the at least one outlet vent opening may be positioned opposite the electric generator and the engine fan relative to the dividing plate, (f) the frame assembly may further comprise a pan, the engine and the electric generator being connected to the pan, and the at least one outlet vent opening being formed in the pan, (g) the at least one outlet vent opening may be formed in the pan opposite the engine relative to the dividing plate, (h) the housing assembly may further comprise a cover, and the at least one inlet vent opening may be formed between the cover and the pan, (i) the pan may further comprise at least one recessed portion such that the at least one inlet vent opening is formed between the at least one recessed portion of the pan and the cover, (j) the cover may further comprise at least one cover opening, the at least one inlet vent opening further comprising the at least one cover opening, (k) the engine may further comprise an oil sump, the engine fan being configured to draw air across the oil sump during operation of the electric generator system, (l) an engine fan outlet opening may be formed through the dividing plate, (m) the engine fan may further comprise an engine fan housing and an engine fan inlet opening, (n) the engine fan may be an axial fan and the engine fan inlet opening may be formed radially around the engine fan through the engine fan housing to draw air into the engine fan from within the housing assembly and direct air through the engine fan outlet opening formed through the dividing plate, (o) the housing assembly may further comprise a door having at least one door opening, the at least one inlet vent opening further comprising the at least one door opening, (p) the at least one electrical component may further comprise a control system, (q) the control system may be positioned proximate the at least one door opening such that air drawn through the at least one door opening passes across the control system during operation of the electric generator system, (r) the at least one electrical component may be an inverter, (s) the frame assembly may be configured to secure the electric generator system to a surface of a storage area within a recreational vehicle, (t) the muffler assembly may further comprise a muffler bellow connecting the muffler assembly to the engine, (u) a cooling duct may be formed in the dividing plate, the muffler bellow passing through the cooling duct, and/or (v) the engine may be an internal combustion engine.

Another aspect of the present technology is directed to an electric generator system. The electric generator system includes: an electric generator; an engine operatively coupled to the electric generator to drive the electric generator during operation of the electric generator system, the engine further comprising a crankcase; and a sump assembly including a primary sump and an auxiliary sump to contain oil to lubricate the engine during operation, the primary sump being formed at least partly within the crankcase and the auxiliary sump being formed separately from the crankcase.

In examples of any of the aspects described in the preceding paragraphs: (a) the primary sump may comprise a primary sump tube and the auxiliary sump may comprise an auxiliary sump tube, and the sump assembly may comprise an auxiliary sump connector to fluidly connect the primary sump tube and the auxiliary sump tube, (b) the auxiliary sump connector may be a flexible hose, (c) the crankcase may comprise a crankcase vent and the auxiliary sump may comprise an auxiliary sump vent, and the sump assembly may comprise a vent hose connecting the crankcase vent and the auxiliary sump vent to allow pressure to be equalized between the crankcase and the auxiliary sump during operation, (d) the primary sump may comprise primary sump cooling fins and the auxiliary sump may comprise auxiliary sump cooling fins to dissipate heat during operation, (e) the auxiliary sump may be constructed from aluminum, (f) the auxiliary sump may comprise a drain plug and an oil fill port, and/or (g) the primary sump may comprise a primary sump ridge to ensure that a minimum quantity of oil is retained within the primary sump during operation.

A further aspect of the present technology is directed to recreational vehicle comprising: an electrical system; a body having a plurality of walls; and a storage area enclosed by at least one of the walls, the electric generator system of one of any of the aspects of any of the preceding paragraphs may be positioned within the storage area and may be connected to the electrical system.

Of course, portions of the aspects may form sub-aspects of the present technology. Also, various ones of the sub-aspects and/or aspects may be combined in various manners and also constitute additional aspects or sub-aspects of the present technology.

DETAILED DESCRIPTION OF THE TECHNOLOGY

Figure 1:
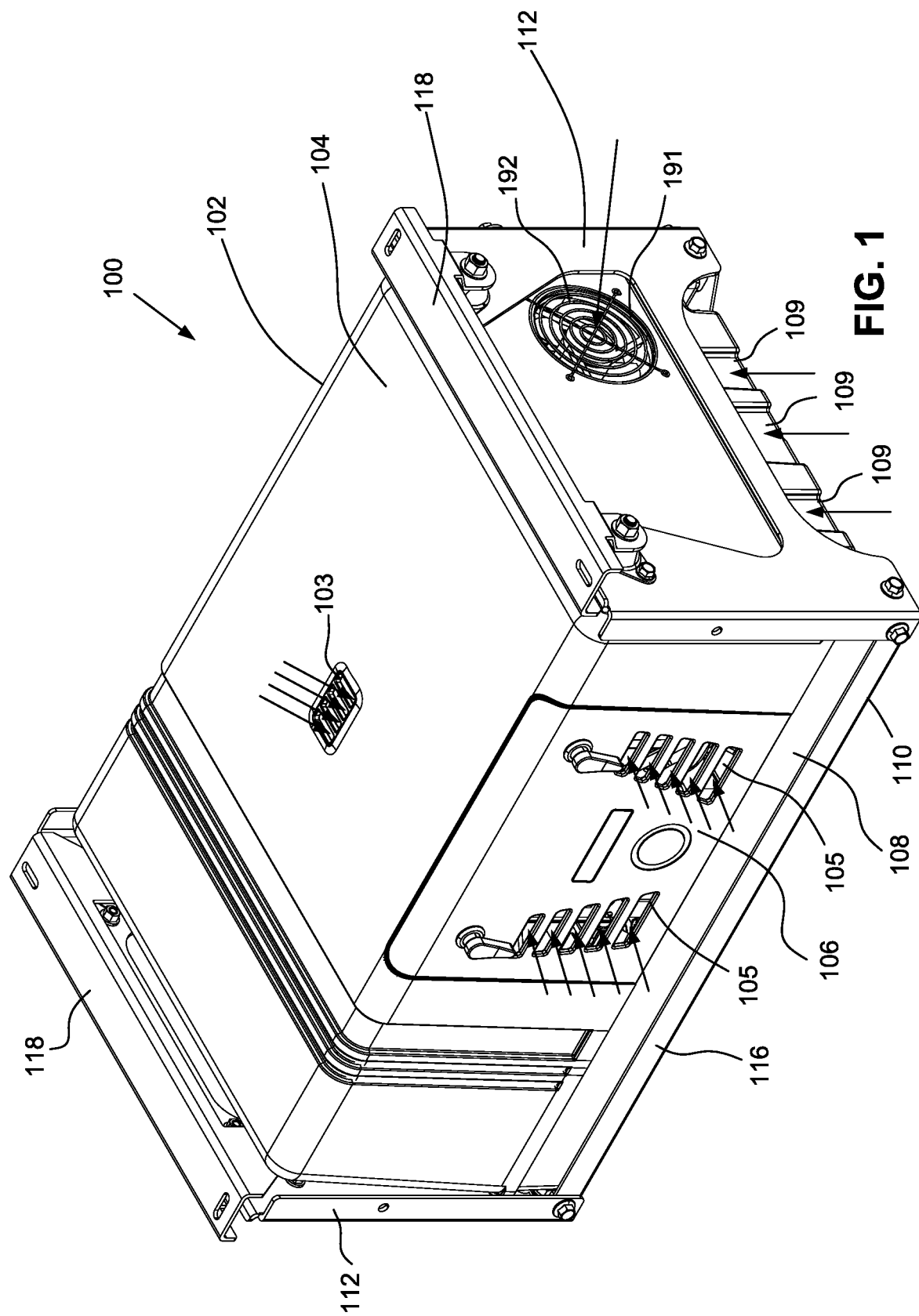
FIG. 1 is a front perspective view of an electric generator system according to an example of the present technology.
Figure 2:
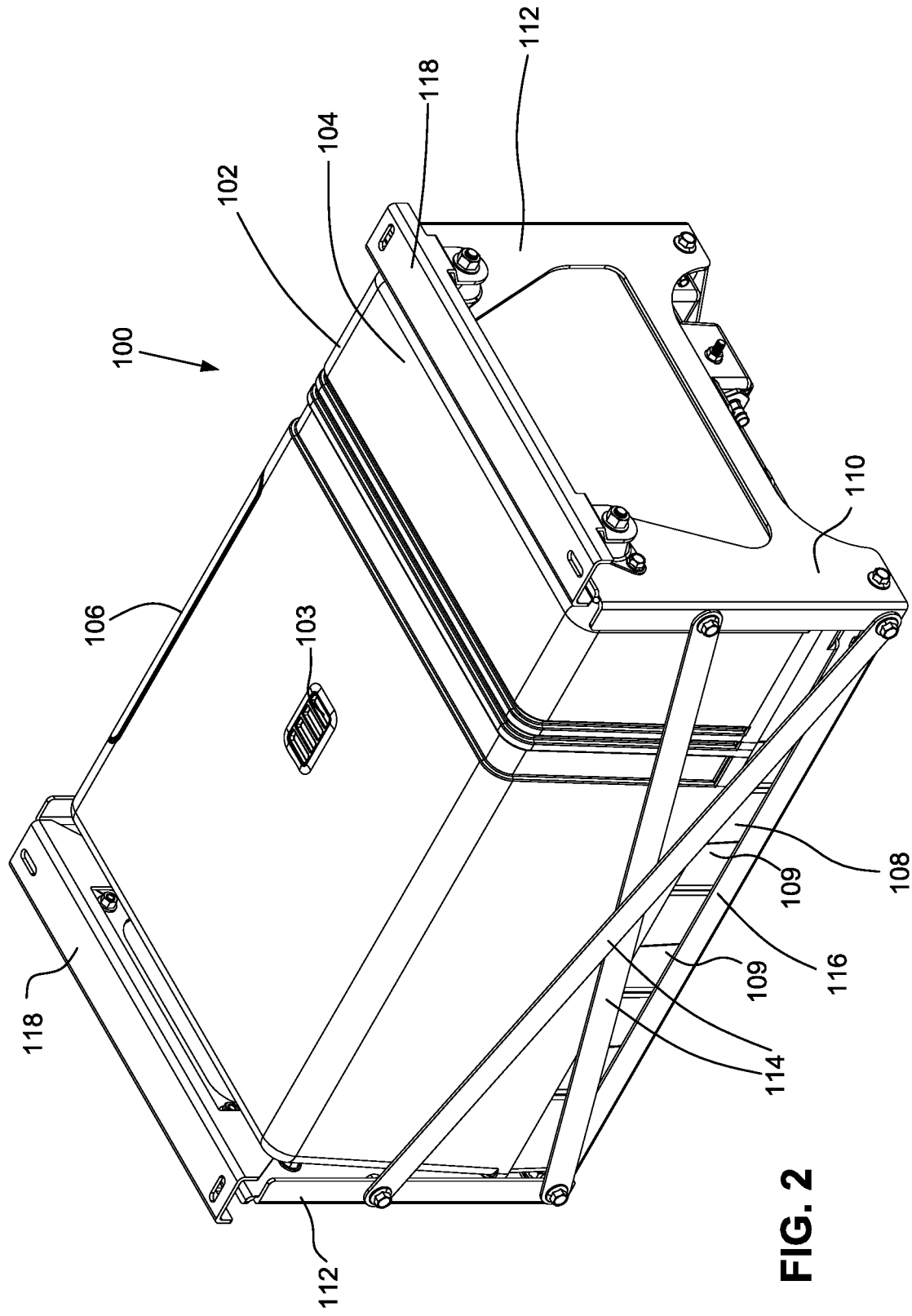
FIG. 2 is a rear perspective view of an electric generator system according to an example of the present technology.
Figure 3:
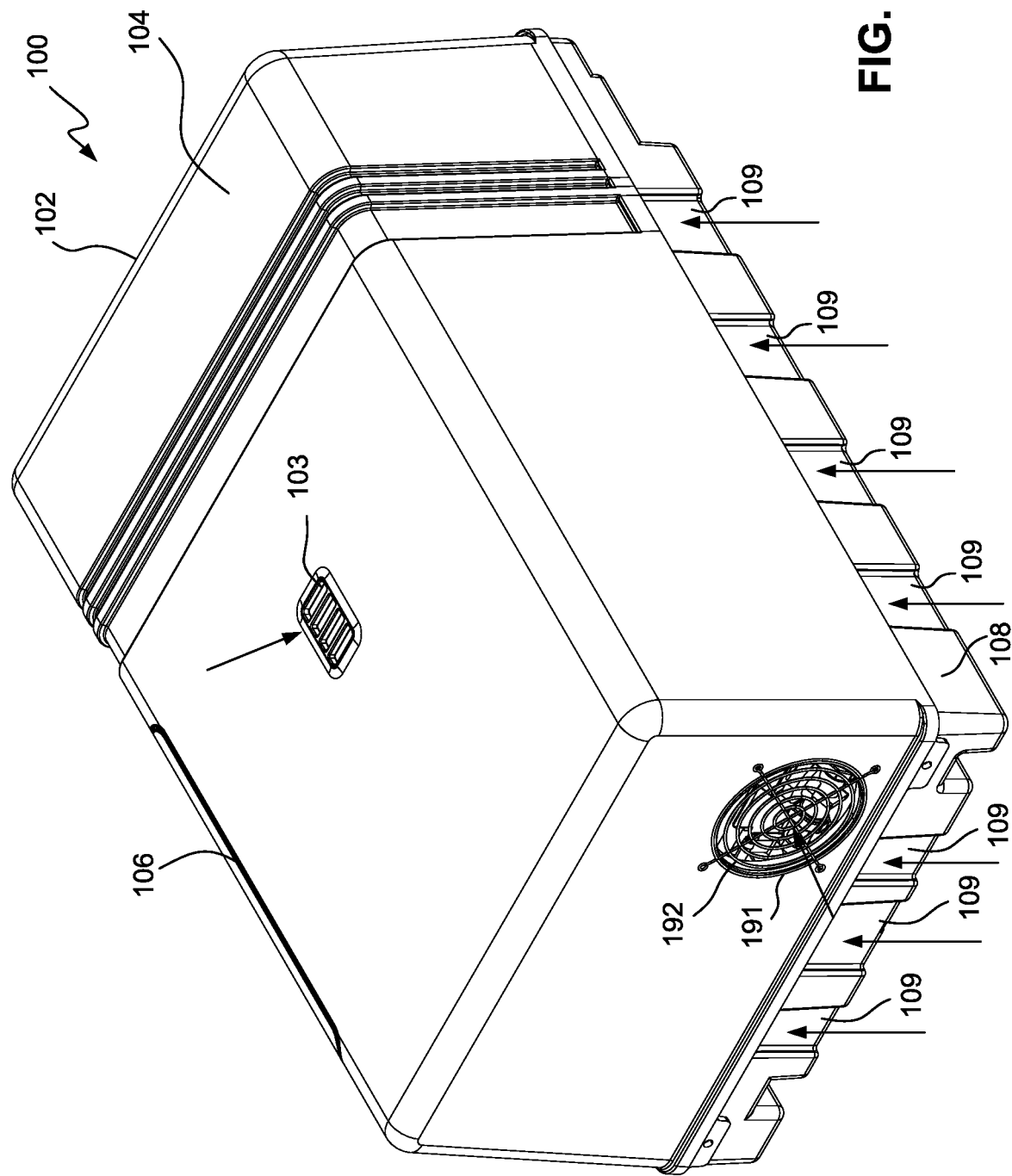
FIG. 3 is a rear perspective view of an electric generator system according to an example of the present technology with portions of the frame assembly removed.
Figure 4:
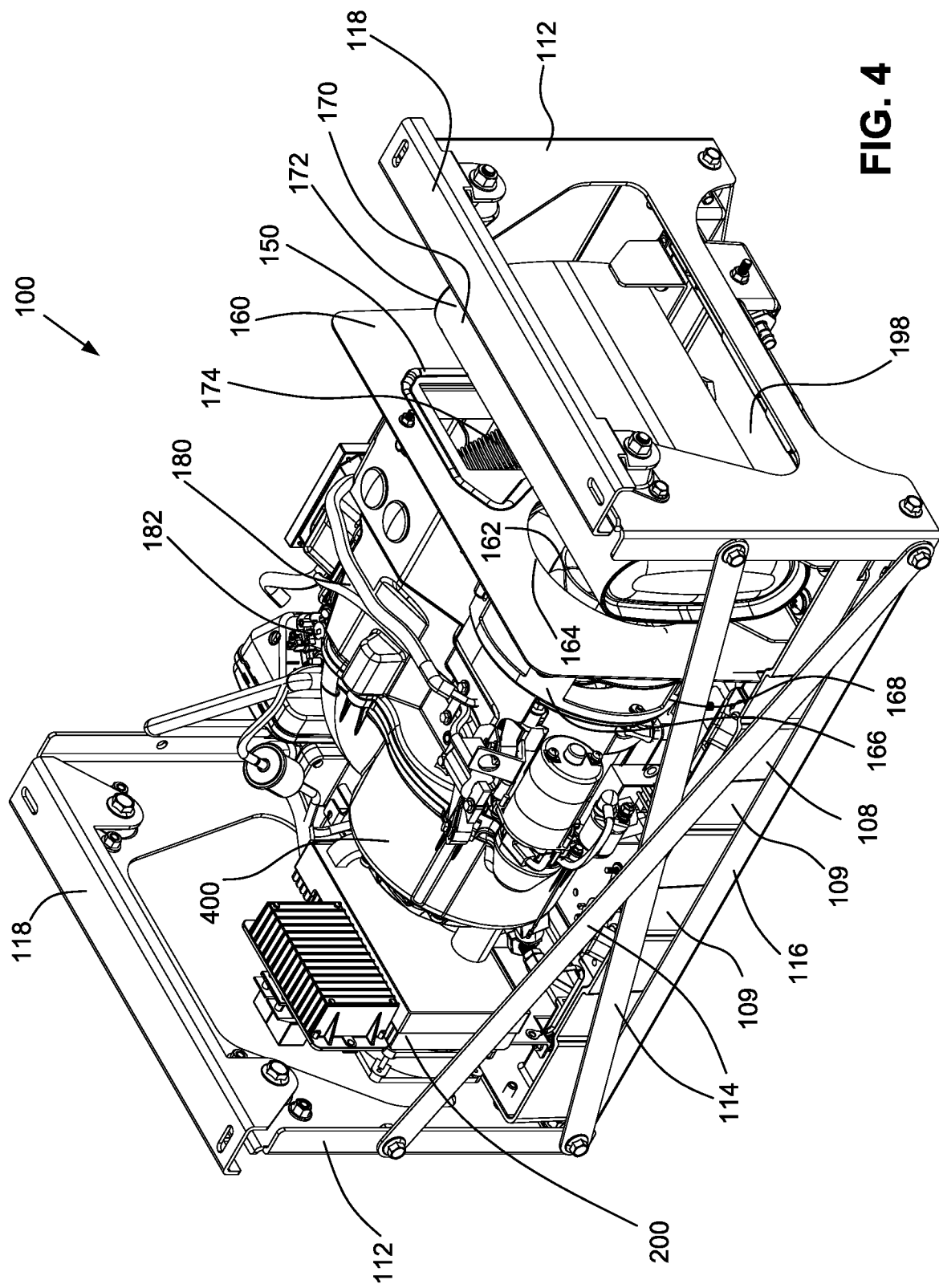
FIG. 4 is a rear perspective view of an electric generator system according to an example of the present technology with portions of the housing assembly removed.
Figure 5:
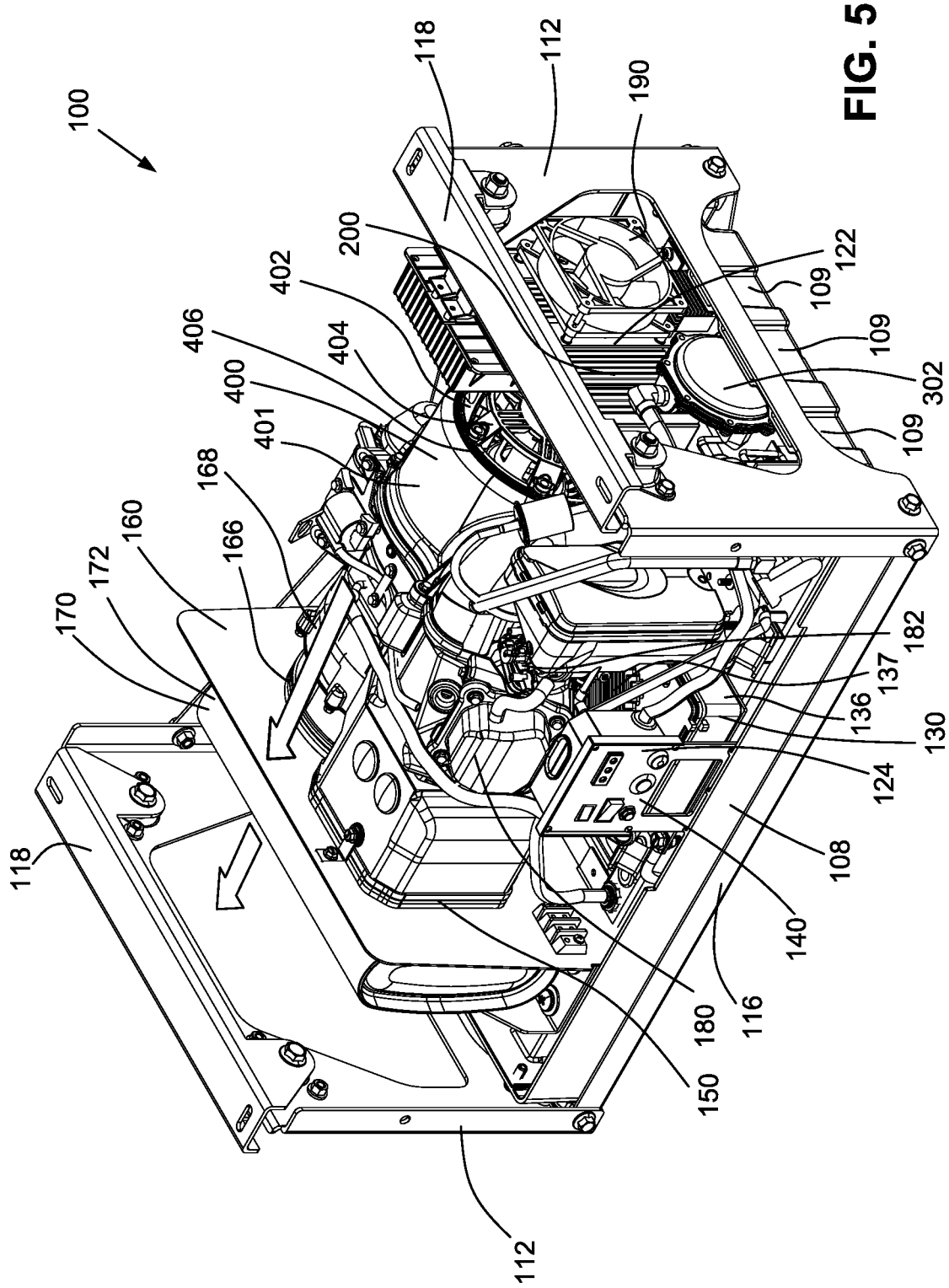
FIG. 5 is a front perspective view of an electric generator system according to an example of the present technology with portions of the housing assembly removed.
Figure 6:
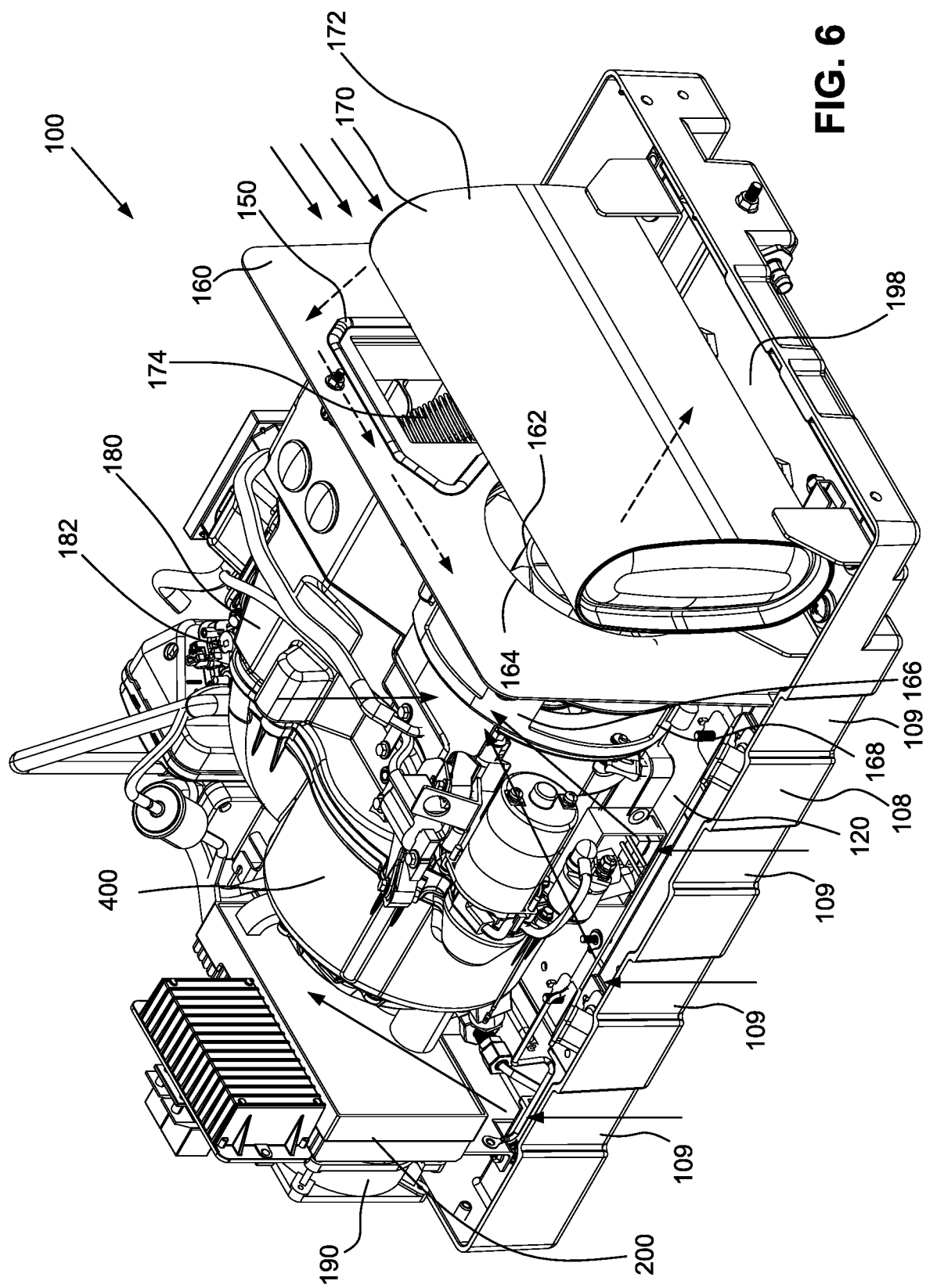
FIG. 6 is a rear perspective view of an electric generator system according to an example of the present technology with portions of the housing assembly and the frame assembly removed.

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

Aspects of the present technology relate to ventilation for an electric generator system 100, such as may be incorporated into a recreational vehicle (RV). As explained above, RV users typically have a need for electricity to power accessories like appliances, an HVAC system, entertainment devices, etc. Furthermore, RV users may find it beneficial to integrate the source of electricity, i.e., the electric generator system 100, into the RV to avoid the need to separately deploy a separate electric generator system every time that it is desired to be used and to simplify storage and transport of the electric generator system 100. Additionally, RVs typically have spaces formed by walls, such as storage areas, built into the body of the RV, and the electric generator system 100 of the present technology may be installed into such a storage area. The examples of the present technology described below pertain, inter alia, to how heat produced during operation of the electric generator system 100 can be managed so that the electric generator system 100 does not overheat and malfunction.

It should be noted that, while the electric generator system 100, may be integrated internally in the RV, such as in an enclosed storage area, it is also envisioned that the electric generator system 100 may be installed on the RV externally so long as the housing assembly 102 is sufficiently robust to provide protection from the elements. The electric generator system 100 technology described herein may also be implemented in other vehicles, such as watercraft, tractor trailers, and aircraft. Additionally, the electric generator system 100 technology described herein may also be implemented in other applications where the electric generator system 100 may be installed in an enclosed space, such as in a storage area of a building, or would otherwise benefit from the enhanced airflow and cooling capacity afforded by this technology.

The electric generator system 100 of the present technology may include a housing assembly 102, which may include a cover 104 and a door 106 that may be connected to the cover 104, e.g., via one or more latches and/or hinges. The door 106 may be removable. The components of the housing assembly 102, e.g., the cover 104 and the door 106, may be made from the same or different materials. The material may be metal or a composite. The material may be thermally insulating or an additional thermally insulating material may be included.

The electric generator system 100 may also include a frame assembly 110 to structurally support the components of the electric generator system 100 and that may also act as an intermediate structure for securing the electric generator system 100 to the RV within the storage area. The frame assembly 110 may include a pan 108, one or more side members 112, one or more support members 114, one or more beams 116, and one or more mounting members 118. The components of the frame assembly 110 may be constructed from the same or different materials, which may be metal or composite. Fasteners and/or adhesive may be used to join the components of the frame assembly 110 to another and to the housing assembly 102.

The pan 108 may be joined to one or more of the side members 112, support members 114, beams 116, and mounting members 118 to form the frame assembly 110. The cover 104 may be connected to one or more components of the frame assembly 110 and the cover 104 may be removable therefrom. An engine mounting plate 120 may be connected to the pan 108 and an engine 180 and an electric generator 400 may be mounted to the engine mounting plate 120 to secure these components to the pan 108.

The engine 180 may be an internal combustion engine. A carburetor 182 may be included to regulate fuel flow into the engine 180 during operation. Alternatively, the engine may be fuel injected. An air filter 184 may be included to filter air before it enters the engine 180. The engine 180 may also be capable of using at least two different fuels, e.g., gasoline and natural gas, and a fuel switch 304 may be used to cease the flow of one fuel and allow the flow of the other fuel to pass to the engine. A fuel pump 300 may pump gasoline to the engine when that fuel is selected, and a regulator 302 may control the flow of natural gas when that fuel is selected. One or more of the fuel-related components may be supported on a fuel handling mounting plate 122.

Figure 14:
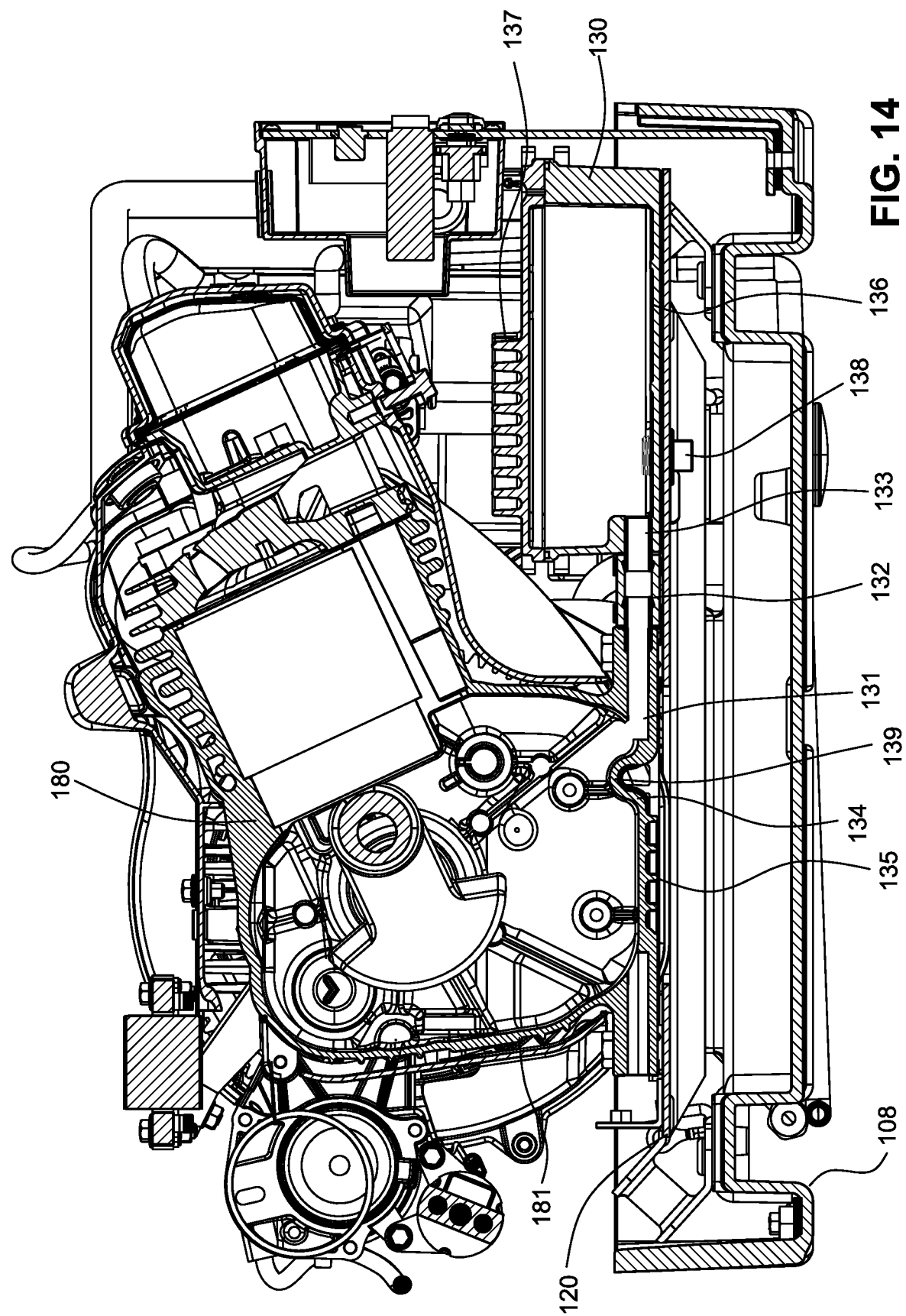
FIG. 14 is a cross-sectional view of an electric generator system according to an example of the present technology taken through line 14-14 of FIG. 11.
Figure 15:
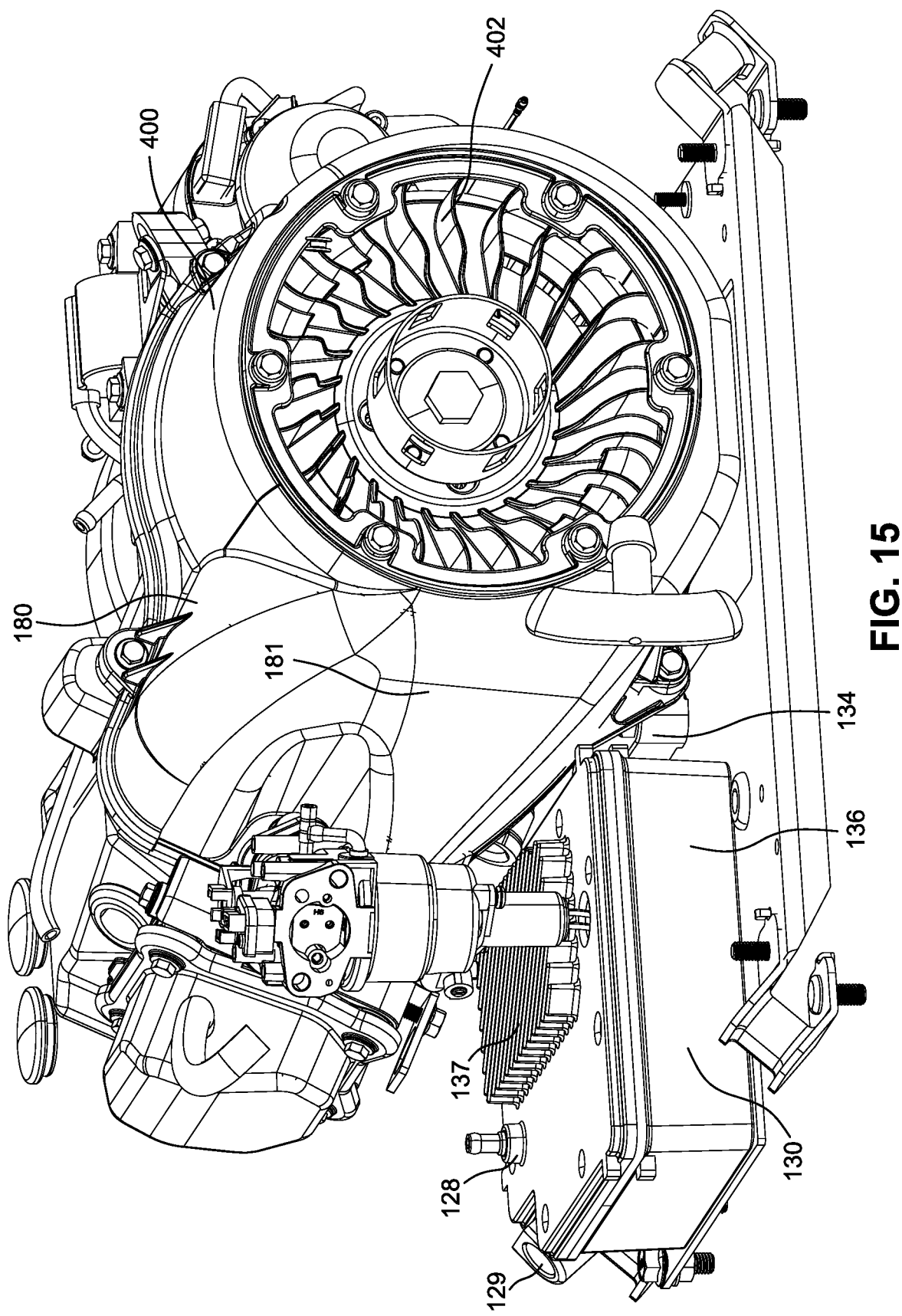
FIG. 15 is a side perspective view of an electric generator system according to an example of the present technology with portions of the housing assembly and the frame assembly, as well as electronic and engine components, removed.
Figure 16:
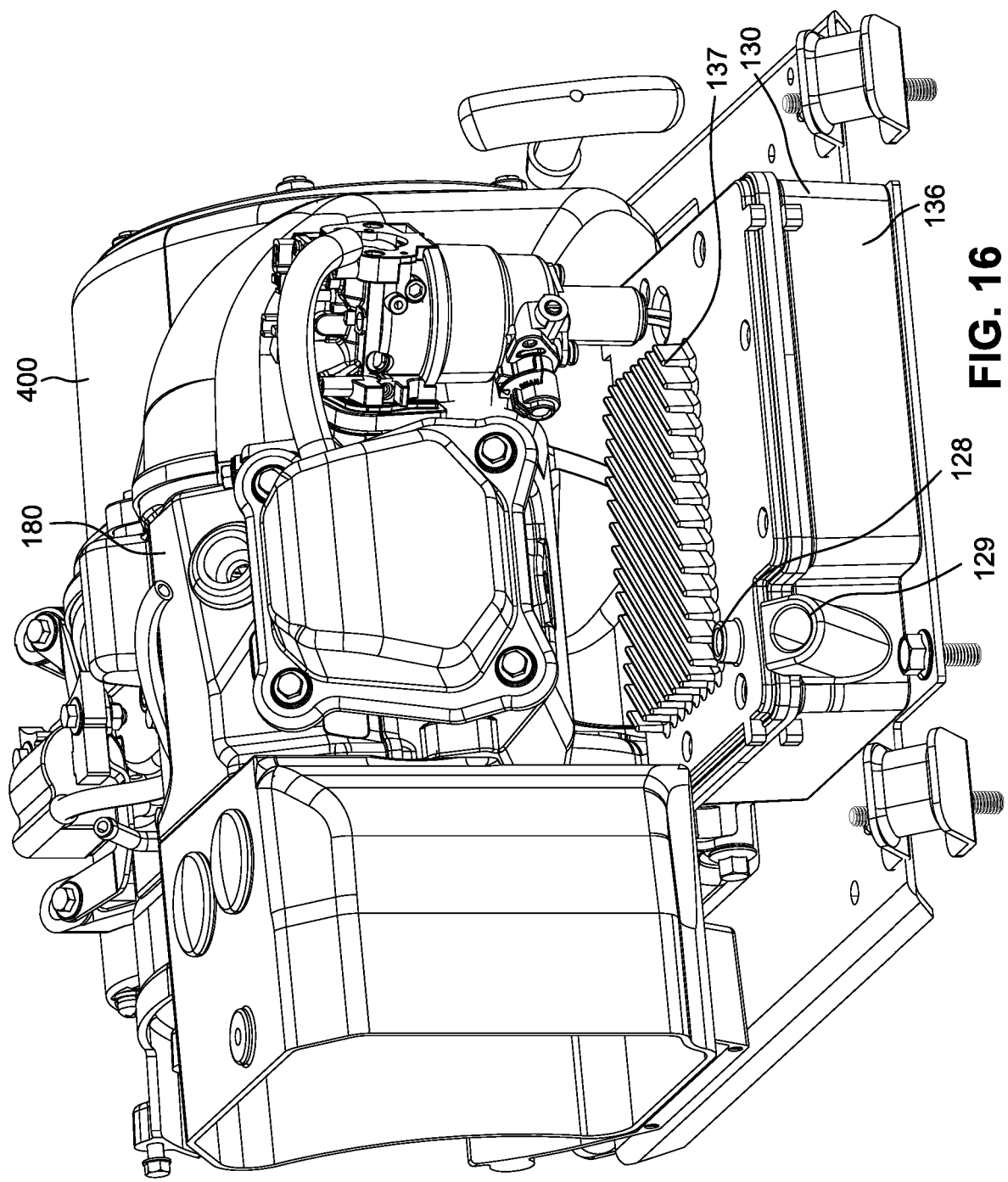
FIG. 16 is a front perspective view of an electric generator system according to an example of the present technology with portions of the housing assembly and the frame assembly, as well as electronic and engine components, removed.

The engine 180 may also include a sump assembly 130 to contain and provide cooling for the engine oil. FIGS. 14-16 depict features of the sump assembly 130, which may include a primary sump 134 and an auxiliary sump 136. As can be seen in FIG. 14, the primary sump 134 may be positioned within an engine crankcase 181. The primary sump 134 may provide oil directly to the moving components of the engine 180, while the auxiliary sump 136 may provide extra volume to allow the sump assembly 130 overall to hold more oil than it would be able to otherwise. For example, as noted elsewhere herein, the generator system 100 may be stowed within an enclosed space inside of an RV and as such it may be difficult to access the generator system 100 to check, change, and/or replenish the oil. Thus, increasing the amount of oil that the engine 180 has available can extend the interval between oil changes.

The primary sump 134 and the auxiliary sump 136 may be connected by a primary sump tube 131, an auxiliary sump connector 132, and an auxiliary sump tube 133. The primary sump tube 131 may extend from the crankcase 181 at the primary sump 134. The auxiliary sump connector 132 may be a flexible hose, e.g., made of rubber. Oil may be able to flow back and forth between the primary sump 134 and the auxiliary sump 136 via the primary sump tube 131, the auxiliary sump connector 132, and the auxiliary sump tube 133. The primary sump tube 131, the auxiliary sump connector 132, and the auxiliary sump tube 133 may allow the oil to be at a consistent level throughout the sump assembly 130.

Figure 7:
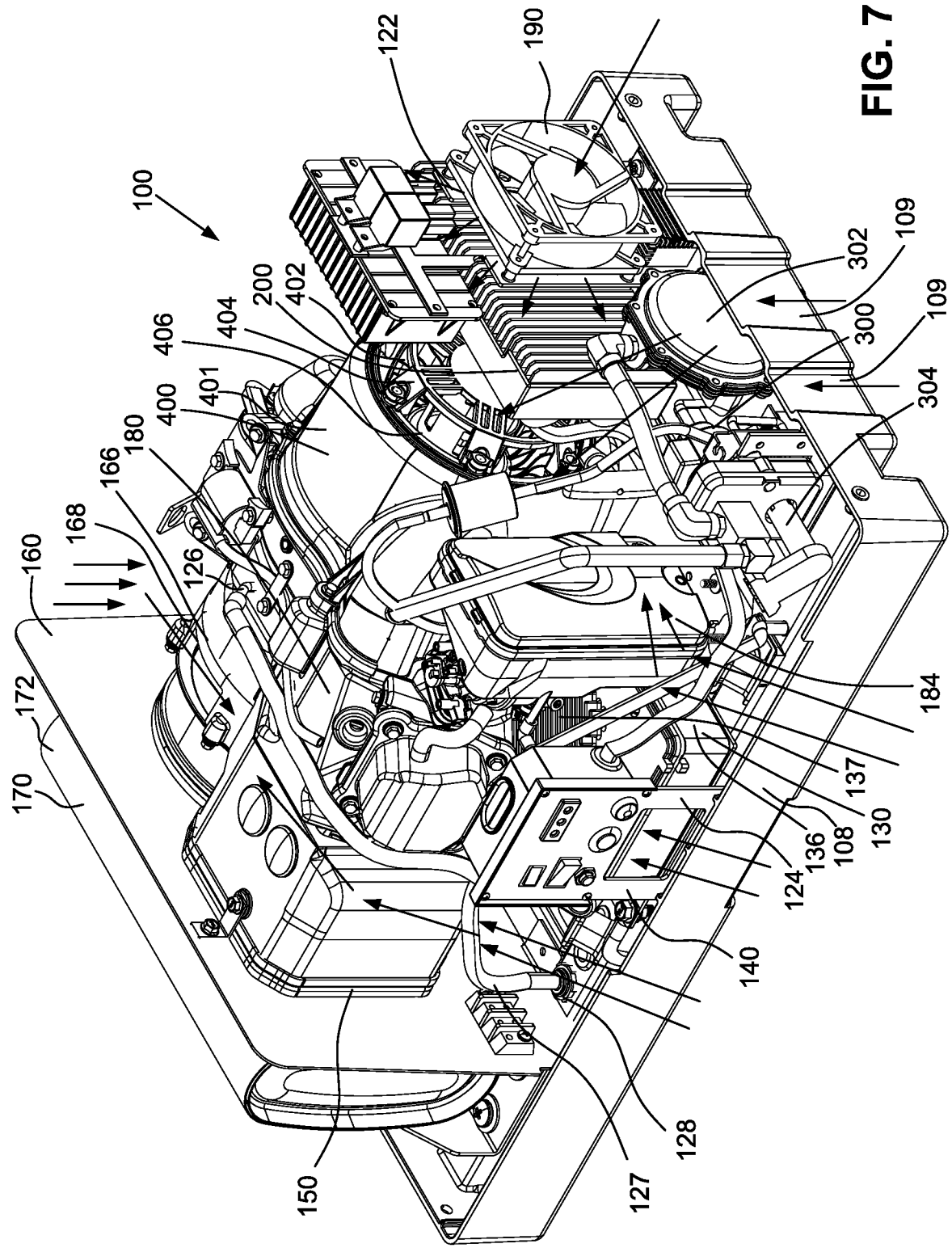
FIG. 7 is a front perspective view of an electric generator system according to an example of the present technology with portions of the housing assembly and the frame assembly removed.
Figure 8:
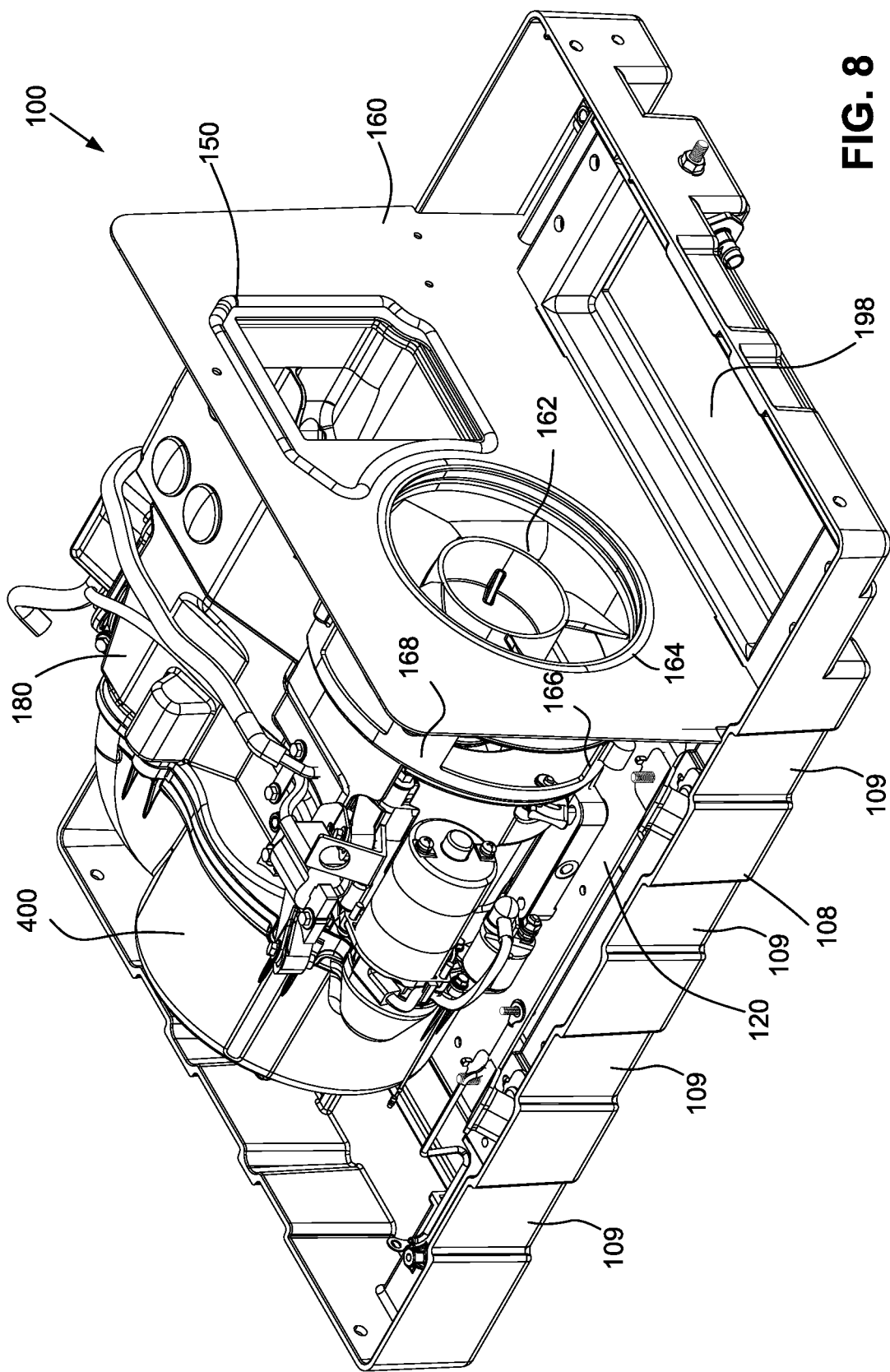
FIG. 8 is a rear perspective view of an electric generator system according to an example of the present technology with portions of the housing assembly, the frame assembly, the muffler assembly, the electrical system, and the fuel system removed.
Figure 9:
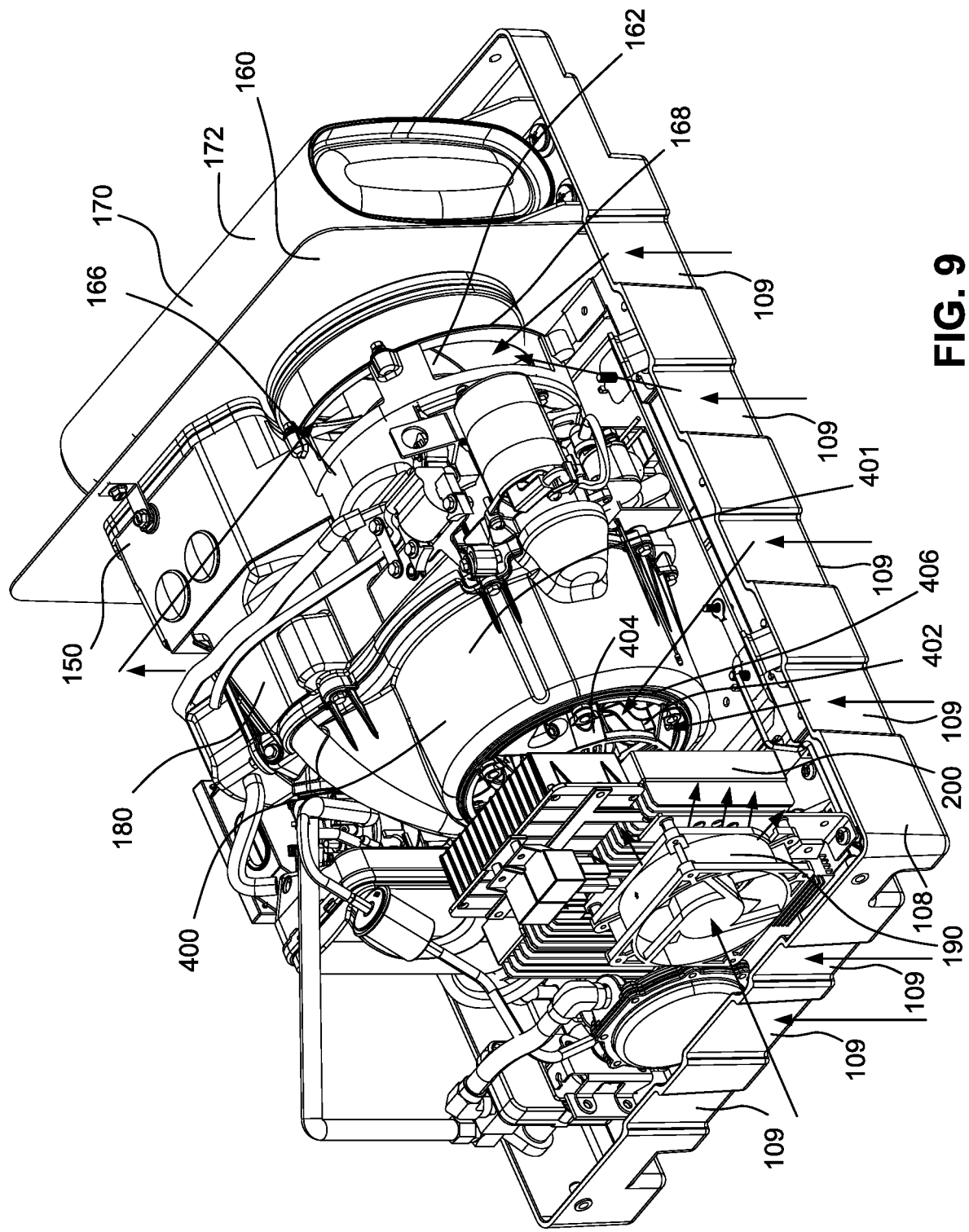
FIG. 9 is another rear perspective view of an electric generator system according to an example of the present technology with portions of the housing assembly and the frame assembly removed.

As seen in FIG. 7, a crankcase vent 126, a vent hose 127, and an auxiliary sump vent 128 may also help to ensure that oil remains at a consistent level throughout the sump assembly 130 by allowing pressure equalization between the auxiliary sump 136 and the primary sump 134. As oil contained within the primary sump 134 is consumed during operation of the generator system 100, the crankcase vent 126, the vent hose 127, and the auxiliary sump vent 128 allow pressure to be equalized within the auxiliary sump 136 relative to the primary sump 134 such that oil can flow from the auxiliary sump 136 to replenish the primary sump 134.

The primary sump 134 and the auxiliary sump 136 may also include primary sump cooling fins 135 and auxiliary sump cooling fins 137, respectively, to dissipate heat from the oil in the sumps 134, 136 during operation. The auxiliary sump 136 may be constructed from aluminum to further dissipate heat during operation.

The auxiliary sump 136 may also include a drain plug 138 that allows oil to be drained from the sump assembly 130 when an oil change is desired. The auxiliary sump 134 may also include an oil fill port 129 for adding oil to the sump assembly 130.

The primary sump 134 may also include a primary sump ridge 139 that may allow for a minimum amount of oil to be maintained within the primary sump 134 for access by the moving components of the engine 180. The primary sump ridge 139 may be beneficial when the engine 180 has consumed a large proportion of the oil in the sump assembly 130 during operation, and the primary sump ridge 139 can ensure that at least some of the remaining oil is available for the engine 180 by preventing oil from flowing out of the primary sump 134 and back into the auxiliary sump 136 when the overall oil volume is below a certain level. The primary sump ridge 139 may also prevent oil from flowing back into the auxiliary sump 136 when the RV is in motion and the generator system 100 is running due to sloshing of oil within the sump assembly 130.

The electric generator system 100 may also include a control system 140 to control operation of the electric generator system 100. The control system 140 may control the engine 180, an engine fan 162 and an electrical component fan 190 that may circulate air through the electric generator system 100, and one or more electrical components, such as an inverter 200. The control system 140 may be connected to the frame assembly 110 by a control system mounting plate 124.

A muffler assembly 170 may also be included to control exhaust noise produced by the engine 180. As noted above, the electric generator system 100 may be installed in an RV and, as such, it may be used when the RV is occupied. Thus, users may find it preferable to minimize the noise produced by the electric generator system 100 during operation. The muffler assembly 170 may include a muffler cover 172 and a muffler bellow 174 to connect the muffler assembly 170 to the engine 180. The cover 104 and the pan 108 may also be insulated to reduce noise.

During operation, the engine 180, the electric generator 400, and other electrical components, such as the inverter 200, produce heat. As explained above, the electric generator system 100 may be mounted in an enclosed storage area, which may restrict cooling airflow, and the cover 104 may further restrict cooling airflow. Thus, as will be explained below, fans and openings in the housing assembly 102 may improve air circulation to enhance cooling airflows over the components of the electric generator system 100. Additionally, the components of the electric generator system 100 may be arranged so that the components that require greater cooling receive the coolest air along the flow path(s). To ensure reliable operation of the electric components of the electric generator system 100, it may be advantageous for the electric components to be located nearest to the coldest air that is available.

As explained above, the electric generator system 100 may employ the inverter 200 to digitally process an AC waveform and, as such, positioning the inverter 200 proximate to the coldest air possible may help ensure that the inverter 200 does not overheat and malfunction. Thus, the electrical component fan 190 may be mounted such that the inverter 200 is adjacent thereto to force air across the inverter 200 that is as cold as is available. The electrical component fan 190 may also be adjacent to a fan opening 191 formed in the housing assembly 102, e.g., in the cover 104, so that the electrical component fan 190 can draw air from outside of the housing assembly 102 that is as cool as possible. Additionally, a grate 192 may be positioned over the fan opening 191 to protect the electrical component fan 190.

Cooling air for the electric generator system 100 may enter the housing assembly 102 from one or more passages or inlet vent openings. The fan opening 191 is one such passage. The cover 102 may also include one or more cover openings 103, which may be louvers. The door 106 may also include one or more door openings 105, which may be louvers. Additionally, the pan 108 and the cover 104 are spaced apart in certain regions to allow air to enter the housing assembly 102. For example, one or more recessed portions 109 may be formed around the perimeter of the pan 108 to allow air to be drawn between the pan 108 and the cover 104 and into the housing assembly 102. Alternatively, the recessed portions 109 may be formed on the cover 104 instead of the pan 108, or in a further alternative, the recessed portions 109 may be formed on the cover 104 and the pan 108.

During operation of the electric generator system 100, the engine fan 162, which may be driven by the engine 180, draws air into the housing assembly 102 via the passages described above. Additionally, the electrical component fan 190 may also draw air into the housing assembly 102. A discharge opening 198 may be formed in the pan 108 proximate the muffler assembly 170, which may provide a passage or an outlet vent opening for hot air to exit from the housing assembly 102.

Figure 10:
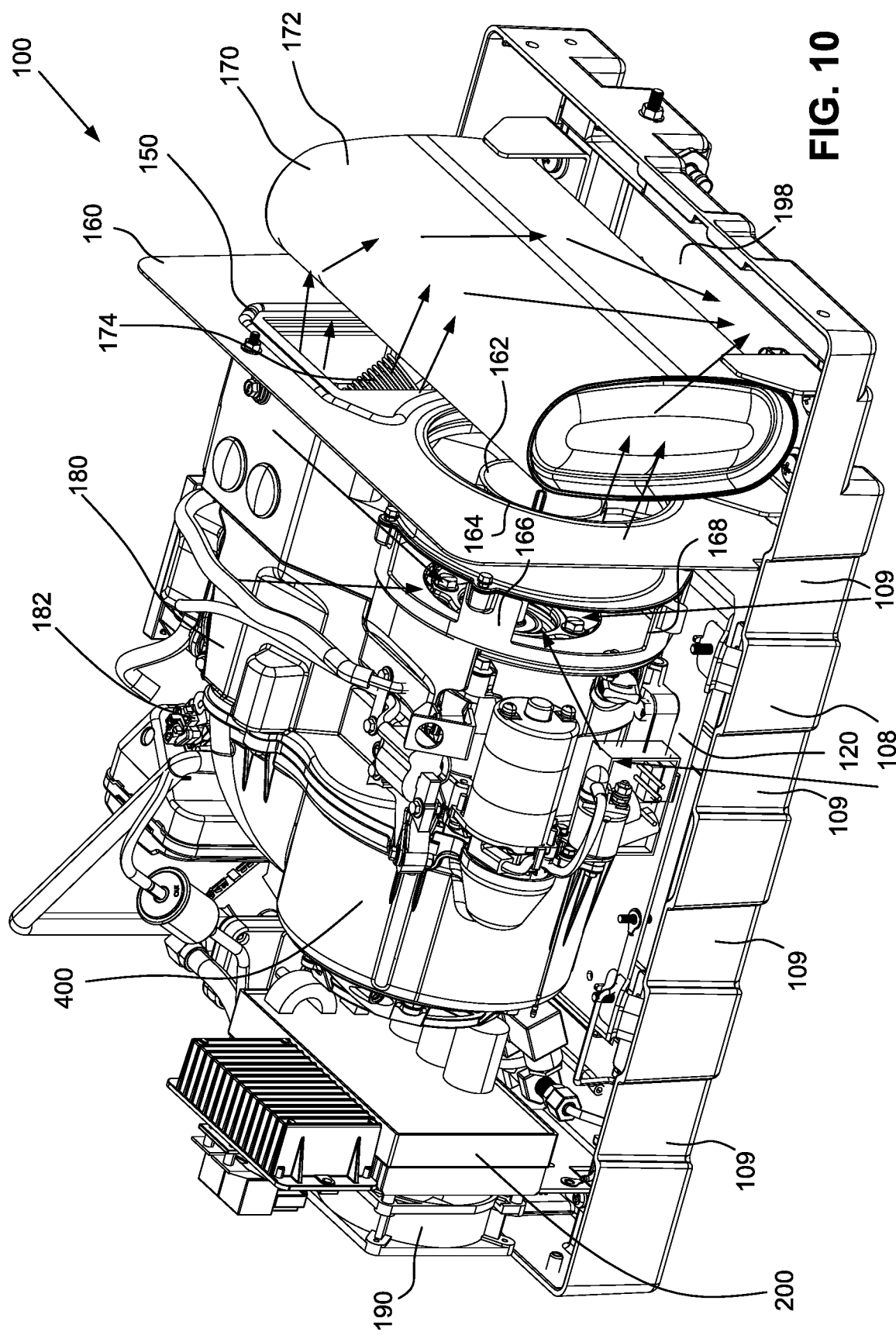
FIG. 10 is another rear perspective view of an electric generator system according to an example of the present technology with portions of the housing assembly and the frame assembly removed.
Figure 11:
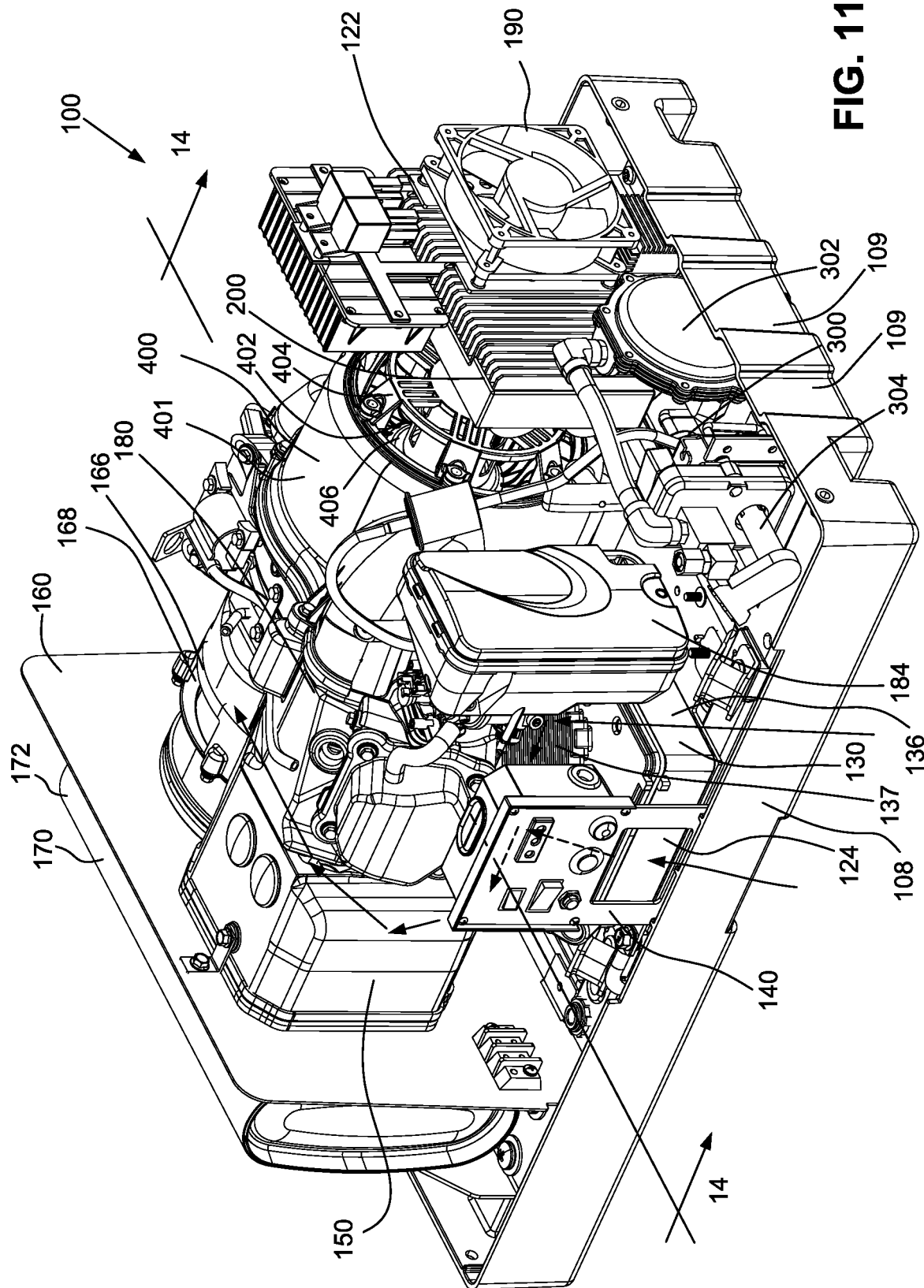
FIG. 11 is a front perspective view of an electric generator system according to an example of the present technology with portions of the housing assembly and the frame assembly, as well as electronic components, removed.
Figure 12:
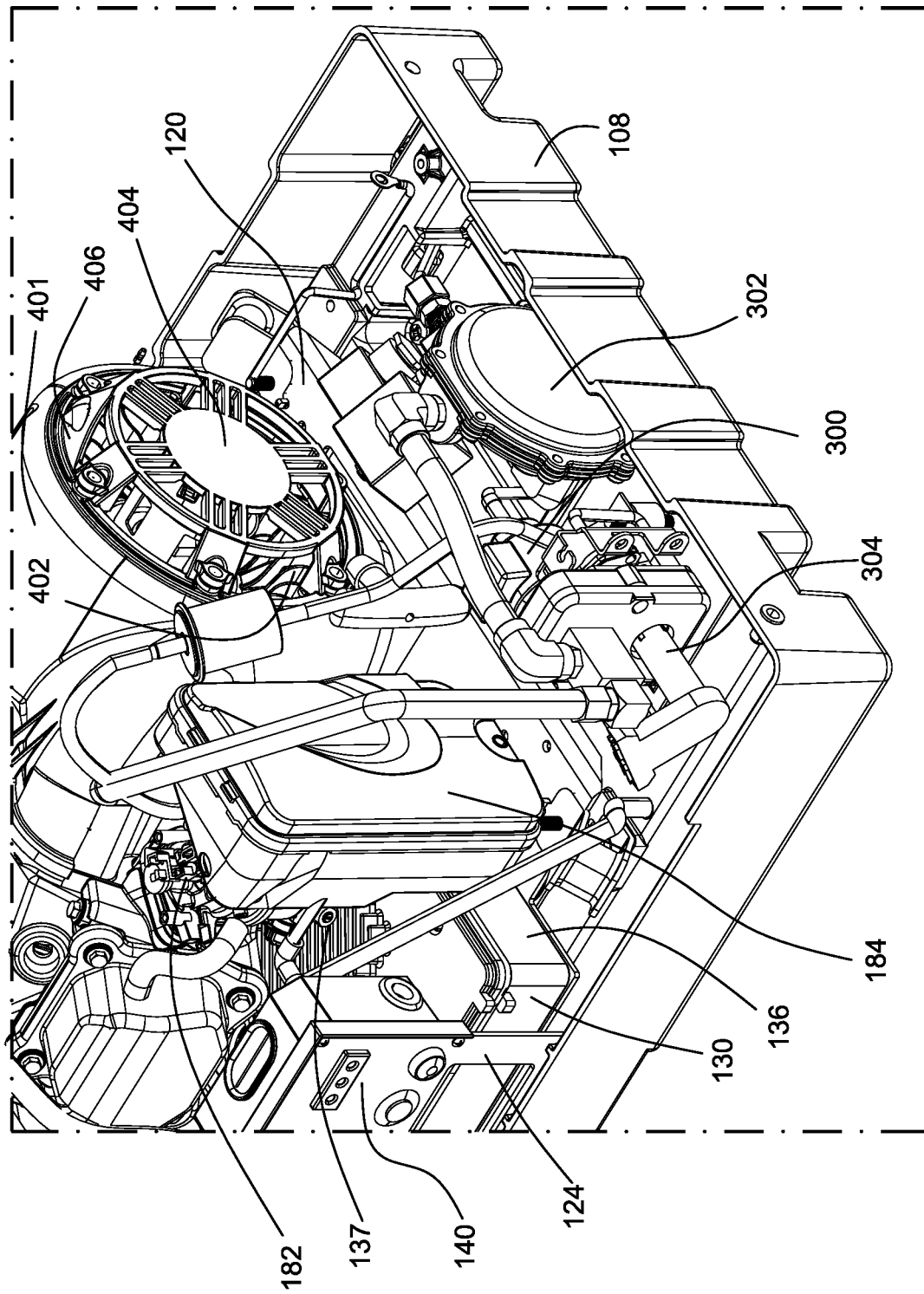
FIG. 12 is a detailed front perspective view of an electric generator system according to an example of the present technology with portions of the housing assembly and the frame assembly, as well as electronic components, removed.
Figure 13:
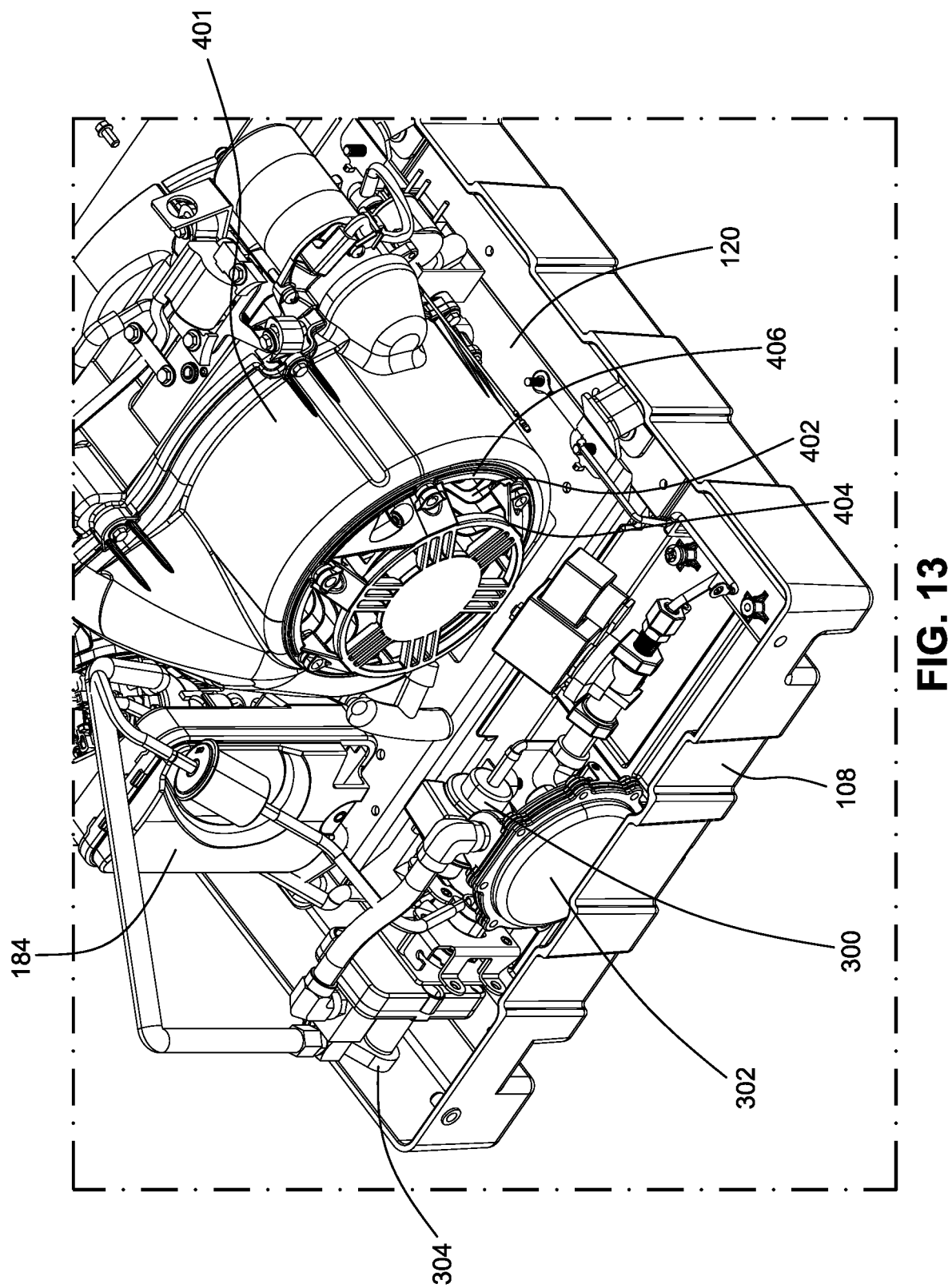
FIG. 13 is a detailed side perspective view of an electric generator system according to an example of the present technology with portions of the housing assembly and the frame assembly, as well as electronic components, removed.

A dividing plate 160 may be positioned within the housing assembly 102 to separate the muffler assembly 170 from the other components of the electric generator system 100. The dividing plate 160 may be constructed from metal or a composite material. The dividing plate 160 may be constructed from a material that is thermally insulating or an additional material that is thermally insulating may be included so that the relatively cool side of the electric generator system 100 is separated from the relatively hot side by the dividing plate 160 (e.g., in FIG. 10, the left side is relatively cool and the right side is relatively hot and these portions or chambers are separated by the dividing plate 160).

The engine fan 162, which may be an axial fan, may be positioned inside of an engine fan housing 166 and an engine fan inlet opening 168 may be formed in the engine fan housing 166. An engine fan outlet opening 164 may pass through the dividing plate 160. A duct 150 may also be formed in the dividing plate 160 to allow the muffler bellow 174 to connect to the engine 180 through the dividing plate 160.

The dividing plate 160 may be sized and shaped such that its edges are flush with or proximate to corresponding surfaces of the cover 104 and the pan 108 to seal or minimize the ability of air to flow across the dividing plate 160 except through the engine fan outlet opening 164. With this arrangement, as well as the engine fan inlet opening 168 and the engine fan outlet opening 164 being open to opposite sides of the dividing plate 160 as depicted in FIGS. 4-11, the engine fan 162 may serve to draw air into the housing assembly 102 from the inlet vent openings described above and direct air out of the housing assembly 102 via the outlet vent opening to circulate fresh, relatively cool air through the electric generator system 100 and prevent overheating.

The electric generator 400, which may be a dynamo or an alternator, may be positioned within an electric generator housing 401. An electric generator fan 402 may also be positioned within the electric generator housing 401 to provide additional cooling, e.g., of the electric generator 400 by directing cooling airflows thereto. An electric generator fan cage 404 may be positioned over the electric generator fan 402 at an electric generator fan opening 406 to prevent other components of the generator system 100 from contacting the electric generator fan 402 during operation.

Flow paths of cooling air are depicted by arrows throughout the drawings to indicate how air may travel through the electric generator system 100. Electrical components, such as the inverter 200 and the control system 140, may be most susceptible to overheating and, as such, these components are positioned closest to openings, e.g., the fan opening 191 and the door openings 105, respectively, so that relatively cool air from outside of the electric generator system 100 reaches these components first. Then, after absorbing heat from these electrical components, the air may travel to the engine 180 and the electric generator 400, e.g., directed by the electric generator fan 401, to absorb additional heat and provide additional cooling. The cooling air may also travel across the sump assembly 130 to provide further cooling for the engine oil contained therein. Air is then drawn into the engine fan housing 166 via the engine fan inlet opening 168, through the dividing plate 160 via the engine fan outlet opening 164, past the muffler assembly 170, and out the discharge opening 198. This arrangement may be understood to form a temperature gradient whereby the coolest air enters from the inlet vent openings, e.g., as indicated by the arrows in FIG. 1, is heated by heat produced by the operation of components of the electric generator system 100, and the directed back out of the electric generator system 100, e.g., as indicated by the arrows in FIG. 10.

The standard ambient temperature rating for a typical generator, i.e., one that is not operated within an enclosed space, is 25° C. to 40° C. Applications associated with the present technology, i.e., a generator system that is operated in an enclosed space, may need to be capable of operating when the temperature in the enclosed space reaches 50° C., and the temperature inside the housing assembly may further elevate to 55° C. 55° C. is considered an extreme ambient temperature rating, but the cooling arrangement disclosed herein may be sufficient to allow the generator system 100 to operate despite such high temperatures.

It is to be understood that the technology is not to be limited to the disclosed examples, but on the contrary, is intended to cover various modifications and equivalent arrangements included within the spirit and scope of the appended claims.

| REFERENCE SIGNS LIST | |
|---|---|
| generator system | 100 |
| housing assembly | 102 |
| cover opening | 103 |
| cover | 104 |
| door opening | 105 |
| door | 106 |
| pan | 108 |
| recessed portion | 109 |
| frame assembly | 110 |
| side member | 112 |
| support member | 114 |
| beam | 116 |
| mounting member | 118 |
| engine mounting plate | 120 |
| fuel handling mounting plate | 122 |
| control system mounting plate | 124 |
| auxiliary sump vent | 128 |
| oil fill port | 129 |
| sump assembly | 130 |
| primary sump tube | 131 |
| auxiliary sump connector | 132 |
| auxiliary sump tube | 133 |
| primary sump | 134 |
| primary sump cooling fins | 135 |
| auxiliary sump | 136 |
| auxiliary sump cooling fins | 137 |
| drain plug | 138 |
| primary sump ridge | 139 |
| control system | 140 |
| duct | 150 |
| dividing plate | 160 |
| engine fan | 162 |
| engine fan outlet opening | 164 |
| engine fan housing | 166 |
| engine fan inlet opening | 168 |
| muffler assembly | 170 |
| muffler cover | 172 |
| muffler bellow | 174 |
| engine | 180 |
| engine crankcase | 181 |
| carburetor | 182 |
| air filter | 184 |
| electrical component fan | 190 |
| fan opening | 191 |
| grate | 192 |
| discharge opening | 198 |
| inverter | 200 |
| fuel pump | 300 |
| regulator | 302 |
| fuel switch | 304 |
| electric generator | 400 |
| electric generator housing | 401 |
| electric generator fan | 402 |
| electric generator fan cage | 404 |
| electric generator fan opening | 406 |

The invention claimed is:

1. An electric generator system comprising:
a housing assembly including a pan;
an electric generator positioned within the housing assembly;
an engine positioned within the housing assembly and operatively coupled to the electric generator;
a muffler assembly positioned within the housing assembly;
a dividing plate positioned between the engine and the muffler assembly and flush with the pan and extending upwardly from the pan; and
an engine fan positioned between the engine and the dividing plate.

2. The generator system of claim 1 wherein:
an engine fan outlet opening positioned on the dividing plate.

3. The generator system of claim 2 further comprising:
an engine fan inlet opening formed radially around the engine fan.

4. The generator system of claim 2 further comprising:
an engine fan outlet opening formed through the dividing plate.

5. The generator system of claim 1 further comprising:
an inlet vent opening positioned on the housing; and
wherein the engine fan draws ambient air into the housing through the inlet vent opening and into the engine fan inlet opening, exhausting the ambient air out of the engine fan outlet opening.

6. The generator system of claim 5 wherein:
the engine fan outlet opening is positioned to force ambient air from the inlet vent over the muffler.

7. The generator system of claim 1 further comprising:
a cooling duct formed in the dividing plate.

8. The generator system of claim 1 further comprising:
thermally insulating material positioned on the dividing plate.

9. The generator system of claim 1 further comprising:
a muffler bellow which passes through the dividing plate.

10. The generator system of claim 1 wherein:
the dividing plate is sized and positioned to be flush with corresponding interior surfaces of the housing.

11. The generator system of claim 1 wherein:
an engine fan outlet opening and an engine fan inlet opening which are positioned on opposite sides of the dividing plate.

12. An electric generator system comprising:
a housing assembly;
an electric generator positioned within the housing assembly;
an engine positioned within the housing assembly and operatively coupled to the electric generator;
a muffler assembly positioned within the housing assembly;
a dividing plate positioned vertically between the engine and the muffler assembly;
an engine fan having an outlet opening that passes through the dividing plate; and
a bellow extending from the muffler and passing horizontally through the dividing plate to connect with the engine.

13. The generator system of claim 12 further comprising:
an engine fan inlet opening formed radially around the engine fan.

14. The generator system of claim 12 further comprising:
an engine fan outlet opening formed through the dividing plate.

15. The generator system of claim 12 further comprising:
a muffler bellow which passes through the dividing plate.

16. The generator system of claim 12 wherein:
the dividing plate is sized and positioned to be flush with corresponding interior surfaces of the housing.

17. The generator system of claim 12 wherein:
an engine fan outlet opening and an engine fan inlet opening which are positioned on opposite sides of the dividing plate.

* * * * *